United States Patent
Engardio et al.

(10) Patent No.: US 6,863,844 B2
(45) Date of Patent: Mar. 8, 2005

(54) PHOTOCHROMIC MATRIX COMPOSITIONS FOR USE IN OPHTHALMIC LENSES

(75) Inventors: Thomas J. Engardio, Vista, CA (US); Paul D. Schlunt, Oceanside, CA (US)

(73) Assignee: Signet Armorlite, Inc., San Marcos, CA (US)

( * ) Notice: Subject to any disclaimer, the term of this patent is extended or adjusted under 35 U.S.C. 154(b) by 0 days.

(21) Appl. No.: 10/232,415

(22) Filed: Aug. 30, 2002

(65) Prior Publication Data

US 2004/0041132 A1 Mar. 4, 2004

(51) Int. Cl.$^7$ .............................. G02B 5/23; G02C 7/10; C08K 5/35
(52) U.S. Cl. ....................... 252/586; 359/241; 351/162; 351/163; 523/135; 524/95; 524/104; 524/110
(58) Field of Search ..................... 252/586; 359/241; 351/152, 162, 163; 523/135; 524/95, 104, 110

(56) References Cited

U.S. PATENT DOCUMENTS

| | | | |
|---|---|---|---|
| 3,565,814 A | 2/1971 | Pellon | |
| 4,544,572 A | 10/1985 | Sandvig et al. | 427/44 |
| 4,756,973 A | 7/1988 | Sakagami et al. | 428/412 |
| 4,758,448 A | 7/1988 | Sandvig et al. | 351/166 |
| 4,851,471 A | 7/1989 | Maltman et al. | 524/719 |
| 4,913,544 A * | 4/1990 | Rickwood et al. | 351/163 |
| 5,021,196 A | 6/1991 | Crano et al. | 252/586 |
| 5,130,353 A | 7/1992 | Fischer et al. | 524/43 |
| 5,185,390 A | 2/1993 | Fischer et al. | 524/43 |
| 5,246,634 A * | 9/1993 | Ichikawa et al. | 351/162 |
| 5,316,702 A | 5/1994 | Blum et al. | 264/1.7 |
| 5,319,007 A | 6/1994 | Bright | 523/516 |
| 5,405,557 A | 4/1995 | Kingsbury | 264/1.7 |
| 5,523,030 A | 6/1996 | Kingsbury | 264/1.7 |
| 5,531,940 A | 7/1996 | Gupta et al. | 264/1.7 |
| 5,683,628 A | 11/1997 | Mizuno et al. | 252/586 |
| 5,694,195 A | 12/1997 | Engardio et al. | 351/177 |
| 5,852,112 A | 12/1998 | Engardio et al. | 525/23 |
| 5,869,658 A * | 2/1999 | Lin et al. | 252/586 X |
| 5,882,556 A | 3/1999 | Perrott et al. | 264/1.38 |
| 5,886,764 A | 3/1999 | Engardio et al. | 351/177 |
| 5,910,516 A | 6/1999 | Imura et al. | 522/39 |
| 5,914,174 A | 6/1999 | Gupta et al. | 428/174 |
| 5,959,761 A | 9/1999 | Perrott et al. | 359/244 |
| 6,099,123 A | 8/2000 | Engardio et al. | 351/177 |
| 6,171,525 B1 | 1/2001 | Effer et al. | 252/586 |
| 6,221,284 B1 | 4/2001 | Florent et al. | 252/586 |
| 6,248,285 B1 * | 6/2001 | Henry et al. | 351/162 X |
| 6,328,445 B1 * | 12/2001 | Buazza | 351/163 X |
| 6,329,482 B1 | 12/2001 | Henry | 526/260 |

OTHER PUBLICATIONS

PCT Search Report; Nov. 4, 2002.

* cited by examiner

*Primary Examiner*—Daniel S. Metzmaier
(74) *Attorney, Agent, or Firm*—Ice Miller

(57) ABSTRACT

Photochromic compositions are disclosed herein. The compositions comprise mixtures of methacrylate monomers, which when polymerized, provide a polymer matrix that exhibits improved fading characteristics of incorporated photochromic dyes and good photochromic temperature stability. The compositions are particularly useful as a composite layer on polymer-based ophthalmic lenses.

31 Claims, No Drawings

PHOTOCHROMIC MATRIX COMPOSITIONS FOR USE IN OPHTHALMIC LENSES

CROSS REFERENCE TO RELATED APPLICATIONS

The present application is related to the patent application entitled "Methods For Preparing Composite Photochromic Ophthalmic Lenses", filed concurrently with this application, the entire contents of which is incorporated herein by reference.

FIELD OF THE INVENTION

The invention relates to composite polymer compositions and, more specifically, to mixed composite polymer compositions suitable for use in photochromic ophthalmic lenses.

BACKGROUND OF THE INVENTION

Organic photochromic dyes are widely used in ophthalmic lenses (eyeglass lenses) to provide significant darkening of the lens when exposed to sunlight. When the lenses are returned to indoor lighting conditions, they preferably fade to a colorless state quickly. These properties allow the wearer of the eyeglasses to go from indoor to outdoor lighting conditions without having to change from a "clear" pair of glasses to a pair of sunglasses.

Plastic photochromic lenses have been on the market for well over a decade. Their photochromic performance has improved as the technology has progressed. Measurement parameters reflecting photochromic performance include:

Faded transmission: a high level of visible light transmission through the lens is most desirable (when in room light or away from direct or intense reflected sunlight);

Darkened transmission: a low level of light transmission through the lens is most desirable (when exposed to sunlight);

Dynamic range: the difference in the percent of light transmission through the lens between the fully faded state and the darkened state. A wide range is most desirable;

Thermal stability: sustained low light transmission when the lens while exposed to light in a hot environment (e.g. desert or tropical). Minimizing the reduction of dynamic range at higher temperatures is most desirable;

Time to darken from faded state to darkened state: a short time period is most desirable;

Time to fade from the darkened state to the faded state: a short time period is most desirable; and The ability to fade in a reasonable amount of time when darkened in a cold environment (e.g. winter weather): a short time period is most desirable.

These performance characteristics are generally expected to be maintained for at least a two year lifetime.

The time to fade is an important feature of a photochromic lens in today's market. Potential customers are often discouraged by the length of time it takes for the lens to fade completely when moved from bright light (e.g. outdoors) to low light (e.g. indoors) conditions. During this fading period, the lenses go through an intermediate transmission range that many people find unattractive. Defining "fade time" or "time to fade" as the time it takes for a darkened lens to fade through 80% of its dynamic range towards the faded state provides a means of comparing different lens products and formulations. These comparative measurements are made under uniform light and temperature conditions. Using this definition, the majority of current commercial state of the art lenses have a time to fade ranging from 12–30 minutes (at 23° C.).

The time to fade exhibited by a given lens depends on the type of photochromic dye, dye concentration, the type of monomers and other additives used to form the polymer matrix, and the relative concentration of those monomers and additives. The time to darken and time to fade for a dye can be influenced strongly by the rigidity of the matrix containing it. Softer matrices can result in improved photochromic response speeds; however, soft matrices can also lead to reduced temperature stability of the photochromic material. In this case the dye would change color very rapidly, however, the dynamic range of the photochromic would be significantly reduced at higher temperatures (such as those encountered by heating as a result of exposure to sunlight). With most photochromic compounds, heat is the primary driving force for transformation of the dye from the darkened state to the faded state and thus a soft matrix would allow the dye to fade while the object is heated by the sun's radiation. Significant fading while the lens is exposed to sunlight is not acceptable because such fade would allow more ambient sunlight to reach the wearer. The polymer matrix must provide a balance between allowing the dye to change from its colored to uncolored state while retarding a rapid fade in a heated condition. The polymer matrix should also retain its photochromic property such that when the lens is darkened in a cold environment, it may still fade enough to allow the person to see when moving from a sunny to a darker condition such as movement from sunlight to indoors.

In today's market it is desirable to produce lenses with indices of refraction greater than 1.50 for reduced lens thickness and greater cosmetic appeal. The pursuit of higher index often comes at the expense of photochromic performance, as in the case of using styrenic components to increase the index.

One of the early problems encountered when incorporating organic photochromic dyes into plastic materials was obtaining satisfactory photochromic dynamic range and speed from the faded to darkened state and vice versa. In some of the early work done incorporating photochromic dyes into cast polymers, certain monomers were found to promote rapid and intense darkening of the dye in the cast specimen.

Use of the monofunctional lauryl methacrylate is suggested in U.S. Pat. No. 3,565,814, and is one of the earliest examples of a methacrylate specified for improving the darkened state of the formed article. However, this patent did not address the problem of time to fade or temperature dependency.

Maltman et al. (U.S. Pat. No. 4,851,471) suggests using highly reactive monomers to reduce the level of a peroxide initiator that is inherently damaging to the photochromic dye. The dye level is used at relatively high concentration to allow for some loss due to attack during polymerization by the initiator. Examples are given using triethylene glycol dimethacrylate as the primary monomer.

More recently, U.S. Pat. No. 5,914,174 discloses the use of hydrophilic polyethylene glycol based difunctional acrylates and methacrylates (with acrylate being preferred), and monofunctional hydrophobic acrylates and methacrylates (with methacrylate being preferred), with a long chain methylene moiety, for use in composite ophthalmic lenses. The monofunctional component is given as 0–70% of the matrix, with the difunctional monomer at 10%–50%, and an allowance of 0–20% for multifunctional components. The mixture is disclosed for use in a specific approach in manufacturing a composite lens by providing the composition as a thin coating on a cast resin substrate and requires the composition to have a viscosity from about 25 cps to about 150 cps at 25° C. This patent exemplifies that at least 30% of the composition be monofunctional acrylates or methacrylates.

The use of difunctional acrylates and methacrylates in lens materials is described in U.S. Pat. Nos. 6,221,284 B1 by Florent, and 6,329,482 B1 by Henry. These formulations are disclosed as suitable for utilization of photochromic dye dispersed throughout the lens, and are comprised of mixtures of other compounds in the lens composition that provide mechanical strength and high refractive index. The formulation proposed by Florent is based on ethoxylated bisphenol A diacrylate or dimethacrylate with aromatic monovinyl and divinyl components. The patent discusses the use of styrene to provide thermal stability and divinyl benzene to improve the level of darkening in photochromic formulations. Henry discloses the use of other difunctional monomers that increase the index of refraction and promote photochromic performance.

U.S. Pat. No. 5,683,628 offers the use of a family of diacrylates and dimethacrylates based on a chain molecule with a central benzene ring, and specific locations along the chain for incorporation of functional groups to boost the index of refraction, and thus avoid use of styrenics. The resins produced are disclosed as affording excellent heat resistance, mechanical strength, adhesion to a hard coat layer, and moldability.

The casting of photochromic lenses using methacrylates and acrylates was also discussed in U.S. Pat. No. 6,171,525 B1 by Effer et al. The patent requires the use of at least one spirooxazine dye, and calls for a high level of polymerization initiator (at least 1.5% by weight).

While the prior art suggests the use of various combinations of composite monomers, none fully explore and optimize the use of these monomers for control of faded state clarity, darkened state light transmission, time to fade, and temperature stability.

The compositions used in the art thus far also have been only at best partially successful at producing ophthalmic lenses that meet the needs of consumers. Thus, there still exists a need for novel compositions for the preparation of ophthalmic lenses that display high transmission in room light, low transmission in sunlight (thus a wide dynamic range), high thermal stability, and short times for darkening and fading even under cold temperature conditions.

SUMMARY OF THE INVENTION

Photochromic compositions containing a mixture of methacrylate compounds are disclosed. The mixtures can comprise a flexible hydrophobic multimethacrylate monomer, and one or both of a flexible hydrophilic dimethacrylate monomer and a flexible hydrophobic mono or dimethacrylate monomer. The compositions can comprise one or more photochromic dyes.

The compositions can be polymerized to afford photochromic polymer materials that display a wide dynamic range, favorable transmission properties, have short fade times, and are thermally stable. The compositions can be used as a layering or coating on ophthalmic lenses and other commercial products.

DETAILED DESCRIPTION OF THE INVENTION

The present invention is directed towards rapidly fading, thermally stable photochromic lens compositions that can be produced using commercially available monomers and dyes, used in combinations not previously disclosed. These compositions are particularly useful for the fabrication of composite photochromic lenses when used in combination with non-photochromic formulations used to impart other physical characteristics to the lens, such as described in the concurrently filed patent application. For example, Signet Armorlite's polyester lens compositions as disclosed in U.S. Pat. Nos. 5,694,195; 5,852,112; 5,886,764; and 6,099,123 provide good strength and index for the resulting composite lens using the photochromic compositions according to the present invention.

The following photochromic behavior has been observed in the polymerized forms of the compositions of the current invention:

Methacrylate monomers provide superior photochromic performance over acrylate monomers. Compositions containing methacrylates have a wider dynamic range than similar compositions containing corresponding acrylates.

Flexible difunctional hydrophilic monomers favor high light transmission in the faded state and fast fading kinetics.

Flexible hydrophobic monomers favor darker activated states than hydrophilic monomers, and can thus expand the dynamic range of a polymer system when used in combination.

Flexible hydrophobic multifunctional (functionality greater than 2) monomers promote temperature stability and color depth (darkness) when activated. However, the faded transmission of these polymer systems is lower than that encountered with the mono or difunctional hydrophobic systems.

The invention is generally directed towards photochromic methacrylate compositions, photochromic polymerized materials prepared from the photochromic methacrylate compositions, and methods for their preparation and use.

One embodiment of the invention is directed towards compositions containing various combinations of methacrylates, and a photochromic dye. A first combination comprises a flexible hydrophobic multimethacrylate monomer, a flexible hydrophilic dimethacrylate monomer, and a photochromic dye. A second combination comprises a flexible hydrophobic multimethacrylate monomer, a flexible hydrophobic methacrylate monomer, and a photochromic dye. A third combination comprises a flexible hydrophobic multimethacrylate monomer, a flexible hydrophilic dimethacrylate monomer, a flexible hydrophobic methacrylate monomer, and a photochromic dye. The word "multimethacrylate" refers to a compound containing three or more methacrylate groups (e.g. 3, 4, 5, 6, 7, 8, 9, 10, and so on).

The flexible difunctional hydrophilic monomer is preferably a dimethacrylate. The monomer generally has a long chain, oxygen containing backbone and two methacrylate moieties. The monomer is preferably a polymeric dimethacrylate. Examples of such monomers include polyethylene glycol dimethacrylates (available from Sartomer and others), urethane dimethacrylates (such as diurethane dimethacrylate available from Rohm America), epoxy dimethacrylates, and polyester dimethacrylates. A presently preferred flexible difunctional hydrophilic monomer is polyethylene glycol (400) dimethacrylate.

The flexible difunctional hydrophilic monomer can generally be present at any concentration. Presently preferred concentrations are about 10 weight percent to about 60 weight percent based on the weight of the composition, and more preferably about 20 weight percent to about 40 weight percent. Specific examples include about 10 weight percent, about 20 weight percent, about 30 weight percent, about 40 weight percent, about 50 weight percent, about 60 weight percent, and ranges between any two of these values.

The flexible hydrophobic monomer is preferably a (mono) methacrylate or a dimethacrylate. The monomer generally has a long chain saturated backbone. Presently preferred monomers are 1,12-dodecanediol dimethacrylate and tridecyl methacrylate. The 1,12-dodecandiol dimethacrylate is one of the few long chain hydrophobic difunctionals currently commercially available and is primarily used for dental applications. It provides flexible crosslinking strength with the hydrophobic twelve carbon chain. The tridecyl methacrylate functions as a bound plasticizer, providing the hydrophobic environment, but may not provide temperature stability or strength contribution.

The flexible hydrophobic monomer can generally be present at any concentration. Presently preferred concentrations are about 0 weight percent to about 50 weight percent based on the weight of the composition. Specific examples include about 10 weight percent, about 20 weight percent, about 30 weight percent, about 40 weight percent, about 50 weight percent, and ranges between any two of these values. If the flexible hydrophobic monomer is a (mono) methacrylate, it is preferred that its concentration be less than about 30 weight percent, less than about 25 weight percent, less than about 20 weight percent, or less than about 10 weight percent based on the weight of the composition.

The flexible hydrophobic multifunctional monomer can generally be any flexible hydrophobic monomer having three or more methacrylate groups. Examples of suitable compounds include bis(trimethylolpropane) tetramethacrylate, both alkoxylated trimethylolpropane trimethacrylate and alkoxylated bis(trimethylolpropane) tetramethacrylate with low levels of alkoxylation, flexible urethane, epoxy, or polyester methacrylates with three or more methacrylate groups. A presently preferred multifunctional monomer is trimethylolpropane trimethacrylate.

The flexible hydrophobic multifunctional monomer can generally be present at any concentration. Presently preferred concentrations are about 10 weight percent to about 80 weight percent based on the weight of the composition. Specific examples include about 10 weight percent, about 20 weight percent, about 30 weight percent, about 40 weight percent, about 50 weight percent, about 60 weight percent, about 70 weight percent, about 80 weight percent, and ranges between any two of these values.

The photochromic dye can generally be any photochromic dye. Presently preferred photochromic dyes include the commercially available CNN7 and CNN8 from Tokuyama Corporation, and Reversacol Ruby Red from James Robinson Ltd. Other dyes having utility with these preferred polymer matrices are in the 1,2b and 2,1b naphthopyran families. It should be noted that not all dyes will follow the behavior of these types. As disclosed in U.S. Pat. No. 5,914,174, certain dyes exhibited a deactivated color that was darker in the polar (hydrophilic) matrix. Surprisingly, this is opposite of what is observed with the preferred dyes in the preferred compositions. However, the effect noted in U.S. Pat. No. 5,914,174 has been observed with certain dyes, such as Reversacol Aqua Green (James Robinson Ltd.).

The compositions can comprise more than one photochromic dye. For example, the composition can contain 2, 3, 4, 5, or more photochromic dyes.

The photochromic dye can generally be present at any concentration. Presently preferred concentrations are about 0.002 weight percent to about 0.15 weight percent based on the weight of the composition. These weight percent values are per dye, i.e. a composition having multiple dyes could contain each dye independently at these concentration ranges.

The composition can further comprise a polymerization initiator. The polymerization initiator can be present at a concentration of about 0.01 weight percent to about 1.0 weight percent based on the weight of the composition, and more preferably about 0.01 weight percent to about 0.50 weight percent. The initiator can be a photoinitiator or a thermal curing initiator. Presently preferred is a photoinitiator which activates when exposed to light of a wavelength less than 500 nm, such as Irgacure 819 (bis(2,4,6-trimethylbenzoyl)-phenylphosphineoxide) by Ciba Specialty Chemicals Corp. added at 0.02–0.06 weight percent. In thermal curing applications, the presently preferred initiators are azo compounds such as Perkadox AMBN (2,2'-azobis(2-methylbutyronitrile) by Akzo Nobel Chemicals Inc., and the like.

Alternatively, the composition can be prepared without a polymerization initiator. Polymerization in the absence of a polymerization initiator can be effected by methods such as treatment with an electron beam, ionizing radiation, ultraviolet radiation, or by thermal treatment.

The composition can further comprise one or more fixed dyes to effect color correction of the faded lens. The fixed dye is preferably at a concentration of less than about 0.001 weight percent based on the weight of the composition. Examples of fixed dyes include Sudan Blue 670 (BASF Corp.), Keyplast Magenta M6B, Keyplast Violet 3B, Keyplast Oil Violet IRS (Keystone Aniline Corp.), and the like.

The compositions can further comprise other additives. The other additives can include non-flexible monomers, compatible plasticizers, antioxidants, hindered amines, and other UV absorbers and stabilizers. The preferred total concentration of the combined additives can be about 0.5 weight percent to about 20 weight percent based on the weight of the composition.

Specific examples of the polymerizable monomer mixtures of the current invention which contain the photochromic dye can comprise: about 10 weight percent to about 35 weight percent polyethylene glycol (400) dimethacrylate, about 0 weight percent to about 50 weight percent 1,12-dodecanediol dimethacrylate, about 12 weight percent to about 80 weight percent trimethylolpropane trimethacrylate, about 0 weight percent to about 24 weight percent tridecyl methacrylate, and about 0 weight percent to about 20 weight percent other additives.

The viscosity of the compositions can generally be any viscosity, such as about 5 cps to about 1000 cps at 25° C. Due to casting techniques currently used in composite lens fabrication, lower viscosities are presently preferred. For example, a viscosity of about 10 cps to about 40 cps at 25° C. or about 10 cps to about 25 cps at 25° C. is presently preferred.

An additional embodiment of the invention is directed towards photochromic polymer materials prepared by polymerizing any of the above described compositions. The polymerizing step can comprise photoinitiating or thermal curing methods. For example, photoinitiating can be performed by exposing the compositions to light of a wavelength suitable for activating the photoinitiator (typically less than 500 nm) for a time sufficient to polymerize the composition. Lamps used to supply the radiation are well known to those skilled in the art of UV curing and include mercury halide arc lamps (such as those made by Aetek and others), microwave-activated lamps (such as those made by Fusion UV Systems and others) and fluorescent lamps (such as those manufactured by Philips and others) capable of achieving an emission of light in the required wavelength range.

The polymerized materials preferably have a dynamic range of at least about 35 at 23° C. The dynamic range can be at least about 35, at least about 40, at least about 45, at least about 50, or at least about 55 at 23° C. The dynamic range can be a range between any two of these values. The calculation of dynamic range is described in the Examples below.

The polymerized materials preferably have a time to fade 80% of their dynamic range of about 30 minutes or less, about 20 minutes or less, about 10 minutes or less, or about 5 minutes or less at 23° C. More preferably, the time to fade is about 4 minutes or less, about 3 minutes or less, about 2 minutes or less, or about 1 minute or less.

Due to the nature of a composite lens, the present invention allows one to select a polymer matrix that promotes photochromic performance exclusively. Monomer combinations can be used that normally would not work in a stand-alone lens formulation. Flexible hydrophilic dimethacrylates contribute to high light transmission in the dyes faded state. These can be combined with flexible hydrophobic methacrylates that contribute deep color and low light transmission in the dye's darkened state. Flexible hydrophobic multifunctional methacrylates contribute to thermal stability (i.e. the dynamic range is not greatly decreased when the article's temperature is increased) due to the crosslink density, and also contribute to the dye's low light transmission in the activated state. When these monomers are combined, they provide formulations for lenses with photochromic performance beyond the current state-of-the-art.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Preparation of Lenses

Compositions for the current invention were determined by first screening monomers, which when combined with photochromic dye(s) and homopolymerized, displayed favorable photochromic response. This was determined by pouring the photochromic compositions into glass tubes and curing the compositions. The tubes were then exposed to sunlight and the darkened color, intensity and fade speed were comparatively observed. Those which exhibited favorable speed and apparent dynamic range were identified as compounds of interest. At this point an examination was made of the families of these compounds to determine the most promising candidates.

Composite lenses were cast using the 1.56 index of refraction polyester formulation (described in Signet Armorlite's U.S. Pat. No. 6,099,123) as the non-photochromic layer, with the photochromic layer cast on the outer surface, as described in Signet Armorlite's concurrently filed application. A hard scratch resistant coating, applied through in-mold coating, was provided for each lens, as described in Signet Armorlite's U.S. Pat. Nos. 4,758,448 and 4,544,572. Lenses were cast using a front mold with a concave curvature of four diopters. The photochromic layer was cast at 1+/−0.1 mm thickness. The completed composite lenses then had their rear surfaces ground and polished to a uniform thickness of 2.1+/−0.1 mm. These cast lenses were edged to a diameter of 50 mm to fit into the temperature controlled photochromic testing apparatus.

In order to eliminate dye combination effects in the examples, only one photochromic dye was used at a time. All examples made with CNN7 (Tokuyama Corp.) were produced with the dye present at 0.04 weight percent. All examples made with Reversacol Ruby Red (James Robinson Ltd.) were made with the dye present at 0.03 weight percent.

The lenses were cured as described in Signet Armorlite's concurrently filed application. The lenses were cured under a Fusion V-bulb (Fusion UV Systems Inc) filtered with a single layer of Edmund #39,426 ultraviolet filter film. The arrangement of light and mold was such that the light entered the assembly through the convex rear mold. The intensity of the light was approximately 1.0 milliwatt/cm$^2$ measured with an International Light IL1400 radiometer equipped with a 405 nm narrow bandwidth filter. Exposure time was 8 minutes. The photochromic matrix contained Irgacure 819 at 0.02–0.06 weight percent, the level of photoinitiator is dependent upon the functionality of the monomer mixture.

Example 2

Analytical Methods

A xenon arc solar simulator was used as a uniform light source for all lenses. A 1.6 KW Large Area Light Source, Model 92190-1000 and a 1600 W Arc Lamp Power Supply, Model 68922 (both manufactured by Thermo Oriel Corp.) formed the basis of the activating light source. Light intensity was maintained during testing, using an Oriel Light Intensity Controller, model 68851. The output of the simulator was modified using airmass correction filters to be capable of approximating sunlight at 50,000 lux (+/−3,000 lux) with a UVA content of 6.5 to 11 W/m$^2$ integrated from 315 to 380 nm as provided by ISO standard 8980-3.

Light intensity of the solar simulator was set and checked using an Ocean Optics Inc. spectrophotometer, model USB2000. The spectrophotometer was calibrated using a Thermo Oriel Standard of Spectral Irradiance bulb (Model 63350), with a specified range of 250–2400nm and a suitable radiometric power supply (Thermo Oriel Model 69935).

The light transmission through the sample lenses was measured using a HunterLab UltraScan XE. This testing device was outfitted with a quartz sample cell to hold the test lens in a temperature controlled water bath. The sample cell was exposed to the simulated sunlight for approximately 30 seconds, then positioned to the UltraScan's measurement port within one second for the measurement flash of the UltraScan's xenon bulb, and then positioned into the simulated sunlight within one second, and the cycle was repeated for a total exposure time of 15 minutes. Readings were then taken without exposure to the simulator at 30 second intervals for an additional 30 minutes.

The sample cell water temperature was maintained within 0.1° C. by a Haake F8 temperature control bath. This unit had both a delivery pump and a receiving pump to transfer water to and from the quartz sample cell. Since transmission readings were made with the samples in a water bath, corrections were made to determine equivalent air transmission values.

The weighted average percent transmission per timed measurement for each lens was determined by using a photopic correction for the individual transmission data for each wavelength analyzed (method is described in ISO Standard 8980-3). Transmission data was collected between 360–750 nm, at 10 nm intervals.

The simulated sunlight intensity was set at 50 klux +/−2% for the visible range, and the UV portion integrated between 315 and 380 nm had an irradiance of 8.7–9.0 W/m$^2$. This condition was set up by using an Air Mass 0 plus two Air Mass 1 filters in series in the xenon solar simulator. This light condition was used for darkening all lens samples.

to simulated sunlight. The dynamic range (DR) is the difference between the faded state transmission and the darkened state transmission. The time-to-fade, 80% DR, is the time required for the lens to fade through 80% of its dynamic range.

Example 4

Chemical Compositions of Formulations A–N

Table 1 lists the formulation examples performed with the CNN7 dye in various monomers. In this and the following examples, compounds are described in terms of their weight percent of the total composition.

TABLE 1

Formulations using CNN7 dye with various monomers

| Form. | BM721 | SR209 | SR238 | SR239 | SR344 | SR350 | SR351 | SR493 | SR603 | Initiator |
|---|---|---|---|---|---|---|---|---|---|---|
| A |  |  |  | 50% |  |  |  | 50% |  | 0.04% |
| B |  |  |  | 100% |  |  |  |  |  | 0.04% |
| C | 100% |  |  |  |  |  |  |  |  | 0.04% |
| D |  |  | 100% |  |  |  |  |  |  | 0.04% |
| E |  | 100% |  |  |  |  |  |  |  | 0.04% |
| F |  |  |  |  |  |  |  |  | 100% | 0.04% |
| G |  |  |  |  | 100% |  |  |  |  | 0.04% |
| H |  |  |  |  |  | 100% |  |  |  | 0.04% |
| I |  |  |  |  |  |  | 100% |  |  | 0.03% |
| J | 24% | 10% |  |  |  | 12% |  | 24% | 30% | 0.06% |
| K | 50% |  |  |  |  | 50% |  |  |  | 0.04% |
| L |  |  |  |  |  | 50% |  |  | 50% | 0.04% |
| M | 33.30% |  |  |  |  | 33.30% |  |  | 33.30% | 0.03% |
| N |  |  |  |  |  | 78% |  |  | 22% | 0.02% |

Prior to testing, all lenses were conditioned for the initial faded state. Lenses were conditioned for a minimum of 8 hours under fluorescent room light measured at 440 +/−20 lux.

Each lens was tested through a darkening and fading cycle as previously described. Light transmission through the lens was measured every 30 seconds during the test. The lens transmission was first measured in the faded state. The lens was then subjected to simulated sunlight, as described above, for fifteen minutes. The simulator light was then extinguished, and the lens transmission was measured through 30 minutes of fading.

Example 3

Calculation of Photochromic Performance Values

The faded state transmission is determined when is the lens in its conditioned form prior to exposure to the simulator light. The darkened state transmission is the lowest light transmission measured during the 15 minute exposure Percentage values are weight percent based on the weight of the composition. BM721 is 1,12 dodecanediol dimethacrylate (Rohm America); SR209 is tetraethylene glycol dimethacrylate (Sartomer); SR238 is 1,6-hexanediol diacrylate (Sartomer); SR239 is 1,6-hexanediol dimethacrylate (Sartomer); SR344 is polyethylene glycol (400) diacrylate (Sartomer); SR350 is trimethylolpropane trimethacrylate (Sartomer); SR351 is trimethylolpropane triacrylate (Sartomer); SR493 is tridecyl methacrylate (Sartomer); and SR603 is polyethylene glycol (400) dimethacrylate (Sartomer). The initiator is Irgacure 819 (Ciba Specialty Chemicals).

Example 5

Chemical Compositions of Formulations O–R

Table 2 lists the formulation examples performed with a different dye, Reversacol Ruby, in various monomers to illustrate the similarity in photochromic behavior relative to CNN7 dye.

TABLE 2

Formulations using Reversacol Ruby dye with various monomers

| Form. | BM721 | SR209 | SR238 | SR239 | SR344 | SR350 | SR351 | SR493 | SR603 | Initiator |
|---|---|---|---|---|---|---|---|---|---|---|
| O |  |  |  |  |  |  |  |  | 100% | 0.04% |
| P |  |  |  |  |  | 100% |  |  |  | 0.04% |
| Q | 100% |  |  |  |  |  |  |  |  | 0.04% |
| R | 33.30% |  |  |  |  |  | 33.30% |  | 33.30% | 0.03% |

Percentage values are weight percent based on the weight of the composition. BM721 is 1,12-dodecanediol dimethacrylate (Rohm America); SR209 is tetraethylene glycol dimethacrylate (Sartomer); SR238 is 1,6-hexanediol diacrylate (Sartomer); SR239 is 1,6-hexanediol dimethacrylate (Sartomer); SR344 is polyethylene glycol (400) diacrylate (Sartomer); SR350 is trimethylolpropane trimethacrylate (Sartomer); SR351 is trimethylolpropane triacrylate (Sartomer); SR493 is tridecyl methacrylate (Sartomer); and SR603 is polyethylene glycol (400) dimethacrylate (Sartomer). The initiator is Irgacure 819 (Ciba Specialty Chemicals).

Example 6

Photochromic Properties of CNN7 Formulations

Table 3 shows the photochromic performance of the CNN7 examples of Table 1, tested at 23° C. The performance data includes the faded state transmission, darkened state transmission, the dynamic range, and the time to fade.

TABLE 3

Photochromic performance of formulations containing CNN7 dye at 23° C.

| Formulation | % Transmission Faded | % Transmission Darkened | Dynamic range | Time to fade 80% DR (minutes) |
|---|---|---|---|---|
| A | 89.0 | 39.3 | 49.7 | 6 |
| B | 88.2 | 42.3 | 46.0 | 4.5 |
| C | 88.3 | 40.4 | 47.7 | 6.7 |
| D | 87.9 | 61.7 | 26.1 | 13.7 |
| B | 87 | 55.4 | 31.2 | 15.8 |
| F | 89.1 | 46.5 | 42.6 | 0.7 |
| G | 89.7 | 76.5 | 13.2 | 0.7 |
| H | 86.8 | 31.8 | 55.0 | 2.7 |
| I | 79.4 | 44.6 | 34.9 | 2.7 |
| J | 89.7 | 47.0 | 42.7 | 3.5 |
| K | 88.9 | 32.8 | 56.1 | 2.8 |
| L | 88.8 | 40.1 | 48.7 | 1.5 |
| M | 89.2 | 44.3 | 44.9 | 1.8 |
| N | 88.5 | 35.2 | 53.3 | 1.2 |

Favorable properties for a formulation are a percent transmission faded of greater than about 84%, a percent transmission darkened of less than about 50%, a dynamic range of greater than about 40%, and a time to fade 80% DR of about five minutes or less.

The largest dynamic ranges were exhibited by the compositions of Formulations K and H at 56.1 and 55.0 respectively. Both had a time to fade of under 3 minutes. The fastest time-to-fade with a satisfactory dynamic range is Formulation F, at 0.7 minute and exhibiting a dynamic range of 42.6. In general, the hydrophobic formulations were darker and the hydrophilic examples faded faster.

Example 7

Photochromic Properties of Reversacol Ruby Formulations

Table 4 shows the photochromic performance of the Reversacol Ruby compositions of Table 2, tested at 23° C. Again, the formulations containing hydrophobic monomers achieved lower light transmission in the darkened state; and the predominantly hydrophilic compositions faded more rapidly than did the hydrophobic compositions.

TABLE 4

Photochromic performance of formulations containing Reversacol Ruby dye at 23° C.

| Formulation | % Transmission Faded | % Transmission Darkened | Dynamic range | Time to fade 80% DR (minutes) |
|---|---|---|---|---|
| O | 89.1 | 55.5 | 33.6 | 2.4 |
| P | 88.7 | 64.1 | 24.6 | 1.6 |
| Q | 89.2 | 53.0 | 36.2 | 4 |
| R | 87.9 | 39.6 | 48.3 | 3 |

Example 8

Photochromic Properties of CNN7 Formulations at 35° C.

Table 5 shows the photochromic performance of selected examples from Table 1 measured at a temperature of 35° C. The example containing the hydrophobic trimethacrylate had the best temperature stability, that is, the difference in dynamic range between the readings at 23° C. and 35° C. is the smallest of those measured.

TABLE 5

Photochromic performance of formulations at 35° C.

| Formulation | % Transmission Faded | % Transmission Darkened | Dynamic range | Time to fade 80% DR (minutes) |
|---|---|---|---|---|
| B | 88.4 | 48.5 | 39.9 | 0.7 |
| C | 89.1 | 52.8 | 36.3 | 2.3 |
| F | 89.8 | 65.5 | 24.3 | 0.4 |
| H | 88.0 | 46.9 | 41.1 | 0.9 |
| K | 89.0 | 48.2 | 40.8 | 1 |
| L | 88.7 | 56.6 | 32.1 | 0.6 |
| M | 89.6 | 59.1 | 30.5 | 0.8 |

Example 9

Comparison of Acrylate and Methacrylate Formulations

The formulations shown above include four pairs of formulations that differ by virtue of containing either an acrylate or methacrylate material. This allowed for direct comparison of the performance of the resulting photochromic matrix materials, leading to the general conclusion that the use of methacrylates instead of acrylates lead to the production of superior photochromic matrix compositions.

Formulation D was prepared with 1,6-hexanediol diacrylate for direct comparison with Formulation B (which contains 1,6-hexanediol dimethacrylate). Formulation D's dynamic range of 26.1 is significantly lower than that obtained with the methacrylate version (46.0). Time-to-fade is about 3 times longer.

Formulation G contains polyethylene glycol (400) diacrylate. It has similar faded transmission and time-to-fade as Formulation F (containing polyethylene glycol (400) dimethacrylate), but a very small dynamic range (13.2 compared to Formulation F's 42.6) and high transmission in the darkened state (76.5% compared to Formulation F's 46.5%).

Formulation I is composed solely of trimethylolpropane triacrylate. The dynamic rage is significantly lower than observed with Formulation H containing trimethylolpropane trimethacrylate (34.9 compared to 54.9). Time-to-fade is the same. Formulation I has the lowest faded transmission (79.4%) of all the tested formulations.

Formulation P consists solely of polyethylene glycol (400) diacrylate containing Reversacol Ruby dye. As observed before, the acrylate formulation has inferior dynamic range than observed with Formulation O containing polyethylene glycol (400) dimethacrylate (24.6 as compared to 33.6). It does fade more quickly than did the methacrylate version (1.6 minutes compared to 2.4 minutes).

Example 10

Formulations Containing Multiple Photochromic Dyes

Formulations can be prepared containing multiple photochromic dyes. A composition was prepared containing the following materials.

TABLE 6

Composition containing three photochromic dyes

| Component | Weight percent |
|---|---|
| SR 493 | 24 |
| BM 721 | 24 |
| SR 603 | 30 |
| SR350 | 12 |
| SR 209 | 10 |
| Initiator 819 | 0.06 |
| Dye CNN7 | 0.09 |
| Dye CNN8 | 0.021 |
| Dye Reversacol Ruby Red | 0.033 |

Lenses were prepared and tested as described above in Examples 1 and 2. The resulting lens material was characterized at both 23° C. and at 35° C. as shown in the following table.

TABLE 7

Photochromic performance of multi-dye composition

| Property | value at 23° C. | value at 35° C. |
|---|---|---|
| Faded transmission | 86.7% | 86.4% |
| Darkened transmission | 19.9% | 37.1% |
| Dynamic range | 66.8% | 49.3% |
| Time to fade 80% DR | 4.3 minutes | 1.2 minutes |

The composition displayed favorable photochromic properties at both 23° C. and at 35° C.

Formulations containing one or more methacrylate compounds are been shown to display favorable photochromic properties. These formulations have high faded transmissions, low darkened transmissions, wide dynamic ranges, short time-to-fade values, and behave well both at moderate and high temperatures.

Example 11

Evaluation of a Commercial Photochromic Lens Product

The properties of a gray semifinished photochromic lens obtained from MariVision Company (Japan) were determined as described above in Examples 2 and 3. The lens was believed to be manufactured by Kureha Chemical Industry Co. (Tokyo, Japan). The Kureha lens is a composite photochromic lens exhibiting a distinct boundary between the photochromic and non-photochromic layers. The photochromic layer thickness, measured at the edge of the lens by calipers, is approximately 0.8 millimeters.

The semifinished lens was ground and polished to a plano configuration of 2.19 millimeters center thickness, the front and rear curves being approximately 3.0 diopters. The resulting finished lens was edged to a diameter of 55 millimeters to fit into the water cell of the photochromic test apparatus. The solar simulator output (with two Airmass 1 filters) was adjusted to approximately 53 klux ahead of the cell, which will result in approximately a 50 klux exposure level at the lens. All readings were taken with the cell water temperature adjusted to 23° C.

In the faded state, the Kureha lens has a yellow-green appearance. Upon darkening, the lens color is green-blue-green. During fade, the lens gradually shifts from green-blue-green to yellow-green. The optical properties of the Kureha lens were determined as shown in Table 9.

TABLE 9

Properties of Kureha lens

| % Transmission (Faded) | 75.4% |
|---|---|
| % Transmission (Darkened) | 30.5% |
| Dynamic Range | 44.9 |
| Time to Fade 80% of the Dynamic Range | 32.2 minutes |

The % transmission (faded) is low, and the time to fade is unacceptable.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents which are chemically related may be substituted for the agents described herein while the same or similar results would be achieved. All such similar substitutes and modifications apparent to those skilled in the art are deemed to be within the spirit, scope and concept of the invention.

What is claimed is:

1. A photochromic composition comprising:
   a flexible hydrophobic multimethacrylate monomer;
   a flexible hydrophilic dimethacrylate monomer;
   a flexible hydrophobic methacrylate monomer; and
   a photochromic dye; wherein the flexible hydrophobic multimethacrylate monomer contains three or more methacrylate groups.

2. The composition of claim 1, further comprising a polymerization initiator.

3. The composition of claim 2, wherein the polymerization initiator is present at a concentration of about 0.01 weight percent to about 1.0 weight percent based on the weight of the composition.

4. The composition of claim 2, wherein the polymerization initiator is present at a concentration of about 0.01 weight percent to about 0.5 weight percent based on the weight of the composition.

5. The composition of claim 1, wherein the flexible hydrophilic dimethacrylate monomer is a polyethylene glycol dimethacrylate.

6. The composition of claim 1, wherein the flexible hydrophilic dimethacrylate monomer is polyethylene glycol (400) dimethacrylate.

7. The composition of claim 1, wherein the flexible hydrophilic dimethacrylate monomer is present at a concentration of about 10 weight percent to about 50 weight percent based on the weight of the composition.

8. The composition of claim 1, wherein the flexible hydrophobic methacrylate monomer is a dimethacrylate.

9. The composition of claim 1, wherein the flexible hydrophobic methacrylate monomer is 1,12-dodecanediol dimethacrylate.

10. The composition of claim 1, wherein the flexible hydrophobic methacrylate monomer is a (mono) methacrylate.

11. The composition of claim 1, wherein the flexible hydrophobic methacrylate monomer is tridecyl methacrylate.

12. The composition of claim 1, wherein the flexible hydrophobic methacrylate monomer is present at a concentration of greater than 0 weight percent to about 50 weight percent based on the weight of the composition.

13. The composition of claim 1, wherein the flexible hydrophobic multimethacrylate monomer is a trimethacrylate.

14. The composition of claim 1, wherein the flexible hydrophobic multimethacrylate monomer is trimethylolpropane trimethacrylate.

15. The composition of claim 1, wherein the flexible hydrophobic multimethacrylate monomer is present at a concentration of about 10 weight percent to about 80 weight percent based on the weight of the composition.

16. The composition of claim 1, wherein the photochromic dye is CNN7, CNN8, or Reversacol Ruby Red.

17. The composition of claim 1, comprising two or three photochromic dyes.

18. The composition of claim 1, comprising four or more photochromic dyes.

19. The composition of claim 1, wherein the photochromic dye is present at a concentration of about 0.002 weight percent to about 0.15 weight percent based on the weight of the composition.

20. The composition of claim 1, further comprising a fixed dye.

21. The composition of claim 20, wherein the fixed dye is Sudan Blue 670, Keyplast Magenta M6B, Keyplast Violet 3B, or Keyplast Oil Violet IRS.

22. The composition of claim 1, further comprising a hindered amine stabilizer, a UV absorber, a UV stabilizer, or an antioxidant.

23. The composition of claim 1, characterized by having a viscosity of about 10 cps to about 40 cps at 25° C.

24. The composition of claim 1, capable of polymerization when subjected to an electron beam, ionizing radiation, ultraviolet radiation, or thermal treatment.

25. A photochromic polymer material formed by polymerizing a composition comprising:
   a flexible hydrophobic multimethacrylate monomer;
   a flexible hydrophilic dimethacrylate monomer and a flexible hydrophobic methacrylate monomer;
   a photochromic dye; and a polymerization initiator, wherein the flexible hydrophobic multimethacrylate monomer contains three or more methacrylate groups.

26. The material of claim 25, wherein the polymerizing is photoinitiating or thermal curing.

27. The material of claim 25, having a dynamic range of at least about 35 at 23° C.

28. The material of claim 25, having a time to fade through 80% of its dynamic range of about 5 minutes or less at 23° C.

29. The material of claim 25, having a time to fade through 80% of its dynamic range of about 4 minutes or less at 23° C.

30. The material of claim 25, having a time to fade through 80% of its dynamic range of about 3 minutes or less at 23° C.

31. The material of claim 25, wherein the composition is capable of polymerization when subjected to an electron beam, ionizing radiation, ultraviolet radiation, or thermal treatment.

* * * * *